Patented Sept. 16, 1930

1,776,181

UNITED STATES PATENT OFFICE

JULIUS G. COLLINS, OF KANSAS CITY, KANSAS, ASSIGNOR TO THE PERFECT ANTI-FREEZE COMPANY, A CORPORATION OF COLORADO

ANTIFREEZE COMPOSITION

No Drawing.    Application filed October 23, 1926.  Serial No. 143,800.

This invention relates to a composition of matter designed for use in automobile radiators to prevent freezing, one of the objects of the invention being to provide an inexpensive and efficient preparation which has a very low freezing point whereby it can be used in practically any temperature of the atmosphere.

A further object is to provide a composition of this type which also acts as a means for stopping leaks in radiators.

With the foregoing and other objects in view the invention consists of the following ingredients substantially in the proportions stated, to wit: Water one gallon; sodium chloride (97% test) two pounds.

To one and one-half gallons of the above mixture is added one quart of amber-colored glucose, known to the trade as "glucose 43% gravity test".

It has been found that by using glucose the sodium chloride is neutralized to such an extent that it will not corrode metals. Furthermore should any of the composition leak from the container (such as a radiator) the glucose, immediately upon exposure to the atmosphere, will thicken and stop the leak.

The use of glucose, in a preparation such as described, likewise lowers the freezing point of the preparation from −7° F. (which is the freezing point of sodium chloride) to −16° F.

Attention is directed to the fact that the glucose used in this preparation is of 43% gravity. This is a type of gulcose which is of amber color and will not leave white marks on the radiator or other parts of an automobile should some of the solution dry on the exposed surface of the vehicle as would happen should other grades of glucose be employed. It has been found by actual test that the sodium chloride used as a part of the composition will be properly neutralized by the dark colored glucose (43%). Furthermore this grade of glucose is cheaper and its use is not only advantageous for the reasons heretofore pointed out but also because the cost of production of the composition is materially lessened.

In extremely cold climates where the temperature is frequently below −16° F. this preparation can be so modified as to prevent freezing at any point above −50° F. simply by adding to each gallon of the second mixture above described, one quart of glycerine. Obviously by reducing the amount of glycerine used the freezing point will be raised. For example should one pint of glycerine be used with one gallon of the mixture the freezing point would be −25° F.

Actual tests of the preparation have disclosed the fact that its boiling point is 223° F. and that its action on metals is practically nil.

What is claimed is:

1. An anti-freeze composition including the following ingredients substantially in the proportions stated, namely, water, one and one-half gallons, sodium chloride, three pounds, glucose, one quart and a sufficient amount of glycerin to lower the freezing point to −16° F.

2. A composition of matter for use as an antifreeze, comprising sodium chloride, glucose and water.

3. A composition of matter for use as an anti-freeze, containing equal parts of sodium chloride and glucose in water.

In testimony that I claim the foregoing as my own, I have hereto affixed my signature.

JULIUS G. COLLINS.